United States Patent
Wang et al.

(10) Patent No.: US 10,911,189 B2
(45) Date of Patent: Feb. 2, 2021

(54) UPLINK CONTROL INFORMATION (UCI) IN SHORT DURATION

(71) Applicant: QUALCOMM Incorporated, San Diego, CA (US)

(72) Inventors: Renqiu Wang, San Diego, CA (US); Yi Huang, San Diego, CA (US); Tingfang Ji, San Diego, CA (US); Peter Gaal, San Diego, CA (US); Juan Montojo, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/056,073

(22) Filed: Aug. 6, 2018

(65) Prior Publication Data
US 2019/0052417 A1 Feb. 14, 2019

Related U.S. Application Data

(60) Provisional application No. 62/544,750, filed on Aug. 11, 2017.

(51) Int. Cl.
*H04L 1/18* (2006.01)
*H04L 1/16* (2006.01)
(Continued)

(52) U.S. Cl.
CPC .......... *H04L 1/1893* (2013.01); *H04L 1/1671* (2013.01); *H04L 1/1861* (2013.01);
(Continued)

(58) Field of Classification Search
CPC ... H04L 1/1861; H04L 1/1893; H04L 1/1671; H04L 5/0055; H04W 76/27; H04W 72/0413; H04W 72/0446; H04W 80/02
See application file for complete search history.

(56) References Cited

U.S. PATENT DOCUMENTS

2016/0323011 A1* 11/2016 Tang ................. H04W 72/0446
2018/0077718 A1* 3/2018 Nory ..................... H04L 1/1854
(Continued)

FOREIGN PATENT DOCUMENTS

| WO | 2012061257 A1 | 5/2012 |
| WO | 2017007545 A1 | 1/2017 |
| WO | 2017095607 A1 | 6/2017 |

OTHER PUBLICATIONS

Intel Corporation: "Subframe Structure for NR Dynamic TDD," 3GPP Draft; R1-1612005, Subframe Structure for NR Dynamic TDD, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14, 2016-Nov. 18, 2016, Nov. 13, 2016, XP051175969, 8 pages, Retrieved from the Internet: URL: http://www.3gpp.org/ftp/Meetings_3GPP_SYNC/RAN1/Docs/ [retrieved on Nov. 13, 2016].
(Continued)

*Primary Examiner* — Walli Z Butt
(74) *Attorney, Agent, or Firm* — Patterson & Sheridan, L.L.P

(57) ABSTRACT

Certain aspects of the present disclosure relate to methods and apparatus relating to transmitting uplink control information (UCI) in a short duration. In certain aspects a method includes identifying resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions. In certain aspects, the method also includes transmitting the UCI using the identified resources.

56 Claims, 18 Drawing Sheets

(51) Int. Cl.
  *H04W 76/27* (2018.01)
  *H04L 5/00* (2006.01)
  *H04W 72/04* (2009.01)
  *H04W 80/02* (2009.01)

(52) U.S. Cl.
  CPC ....... *H04L 5/0055* (2013.01); *H04W 72/0413* (2013.01); *H04W 72/0446* (2013.01); *H04W 76/27* (2018.02); *H04W 80/02* (2013.01)

(56) References Cited

U.S. PATENT DOCUMENTS

| 2019/0052421 | A1* | 2/2019 | Yin | H04B 1/713 |
| 2019/0059127 | A1* | 2/2019 | Fan | H04W 76/27 |
| 2019/0312669 | A1* | 10/2019 | Kwak | H04L 1/00 |
| 2020/0014517 | A1* | 1/2020 | Takeda | H04L 5/0053 |

OTHER PUBLICATIONS

International Search Report and Written Opinion—PCT/US2018/045634—ISA/EPO—dated Mar. 15, 2019.
MEDIATEK Inc: "Performance Evaluation on Channel Structure of Short PUCCH for 1 or 2 Bits UCI", 3GPP Draft; R1-1707842_Performance Evaluation on Channel Structure of Short PUCCH for 1 or 2 Bits UCI, 3rd Generation Partnership Project (3GPP), Mobile Competence Centre, 650, Route Des Lucioles, F-06921 Sophia-Antipolis Cedex, France, vol. RAN WG1, No. Hangzhou; May 15, 2017-May 19, 2017 May 14, 2017, XP051273043, Retrieved from the Internet: URL:http://www.3gpp.org/ftp/Meetings_3GPP_SYNC/RAN1/Docs/ [retrieved on May 14, 2017], 6 pages.
Partial International Search Report—PCT/US2018/045634—ISA/EPO—dated Nov. 27, 2018.

* cited by examiner

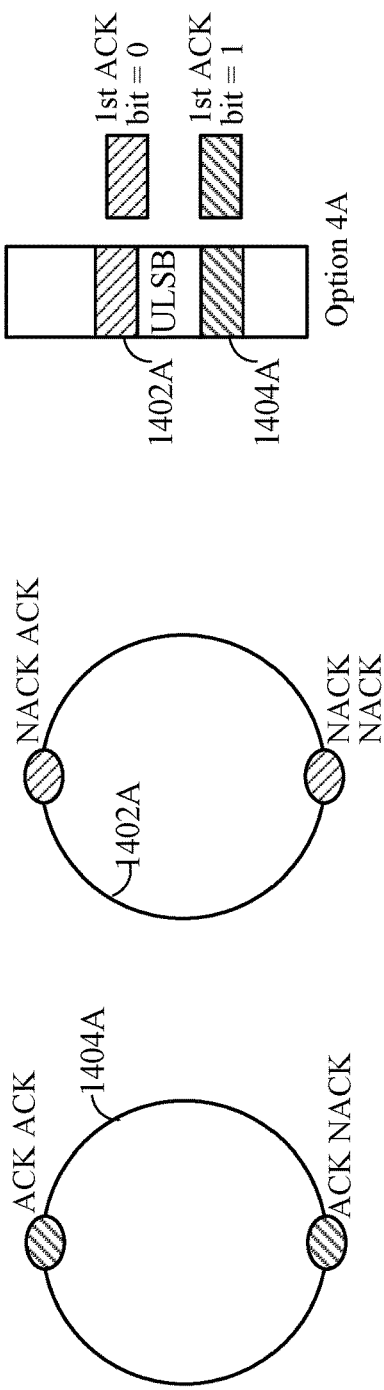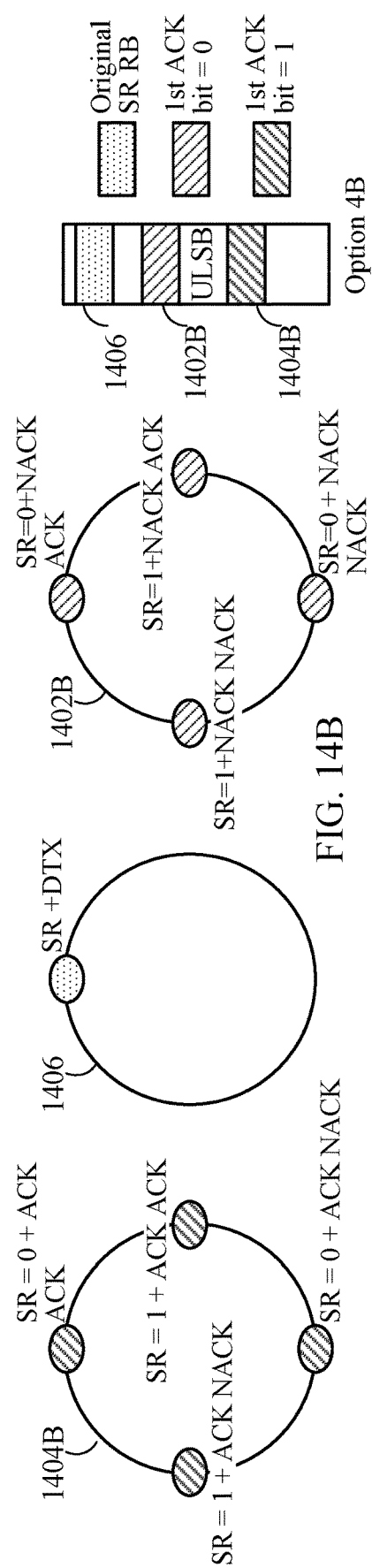
FIG. 14A
FIG. 14B

UPLINK CONTROL INFORMATION (UCI) IN SHORT DURATION

CROSS-REFERENCE TO RELATED APPLICATIONS

This application claims the benefit of U.S. Provisional Application Ser. No. 62/544,750 entitled "UPLINK CONTROL INFORMATION (UCI) IN SHORT DURATION," which was filed on Aug. 11, 2017. The aforementioned application is herein incorporated by reference in its entirety.

FIELD

The present disclosure relates generally to communication systems, and more particularly, to methods and apparatus relating to transmitting uplink control information (UCI) in a short duration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a transmitter. The method generally includes identifying resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions and transmitting the UCI using the identified resources.

Certain aspects provide an apparatus, comprising a non-transitory memory comprising executable instructions and a processor in data communication with the memory and configured, by executing the instructions, to: identify resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions; and transmit the UCI using the identified resources.

Certain aspects provide an apparatus comprising means for identifying resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions; and means for transmitting the UCI using the identified resources.

Certain aspects provide a non-transitory computer readable medium having instructions stored thereon for performing a method comprising: identifying resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions; and transmitting the UCI using the identified resources. Certain aspects provide a method for wireless communications by a user equipment (UE). The method generally includes identifying extended resources, adjacent in time to a common uplink region within a transmission time interval (TTI), dynamically available for uplink transmission by the UE and sending an uplink transmission using the extended resources.

Certain aspects provide an apparatus, comprising a non-transitory memory comprising executable instructions and a processor in data communication with the memory and configured, by executing the instructions, to: identify extended resources, adjacent in time to a common uplink region within a transmission time interval (TTI), dynamically available for uplink transmission by the UE, and send an uplink transmission using the extended resources.

Certain aspects provide an apparatus, comprising: means for identifying extended resources, adjacent in time to a common uplink region within a transmission time interval (TTI), dynamically available for uplink transmission by the UE; and means for sending an uplink transmission using the extended resources.

Certain aspects provide a non-transitory computer readable medium having instructions stored thereon for performing a method comprising: identifying extended resources, adjacent in time to a common uplink region within a transmission time interval (TTI), dynamically available for uplink transmission by the UE; and sending an uplink transmission using the extended resources.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 14a and 14b illustrate example resources corresponding to the example shown in FIG. 13, according to aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
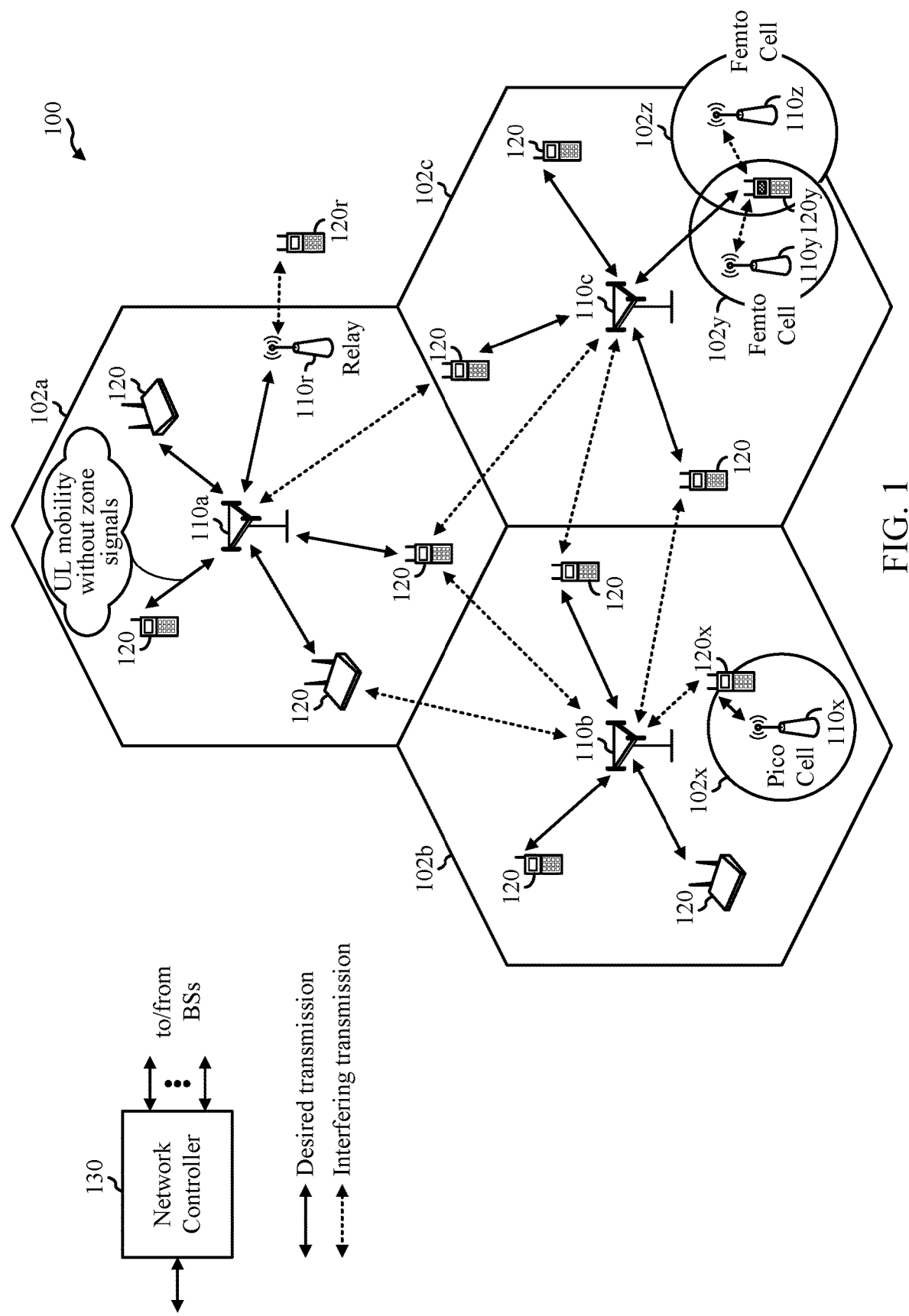
FIG. 1 is a block diagram conceptually illustrating an example telecommunications system, in accordance with certain aspects of the present disclosure.

Aspects of the present disclosure relate to methods and apparatus relating to a channel design for transmitting uplink control information (UCI) in a short burst duration.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

In certain cases, uplink control information (UCI), such as acknowledgment (ACK), channel quality indicator (CQI), or scheduling request (SR) information, may be transmitted in an uplink (UL) short burst (ULSB) of an uplink structure. The ULSB may be 1 or 2 symbols and different techniques may be used to transmit UCI in this duration, as described herein. In one example, SR and ACK bits may be sent in a short duration using time division multiplexing (TDM). In another example, SR and ACK bits may be sent in a short duration using frequency division multiplexing (FDM). Aspects of the present disclosure provide techniques for transmitting UCI that has different types of information, such as 1 or 2 bits of ACK and/or SR.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, UE 120 may perform operations 900 described in FIG. 9 as well as operations 1500 described in FIG. 15.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
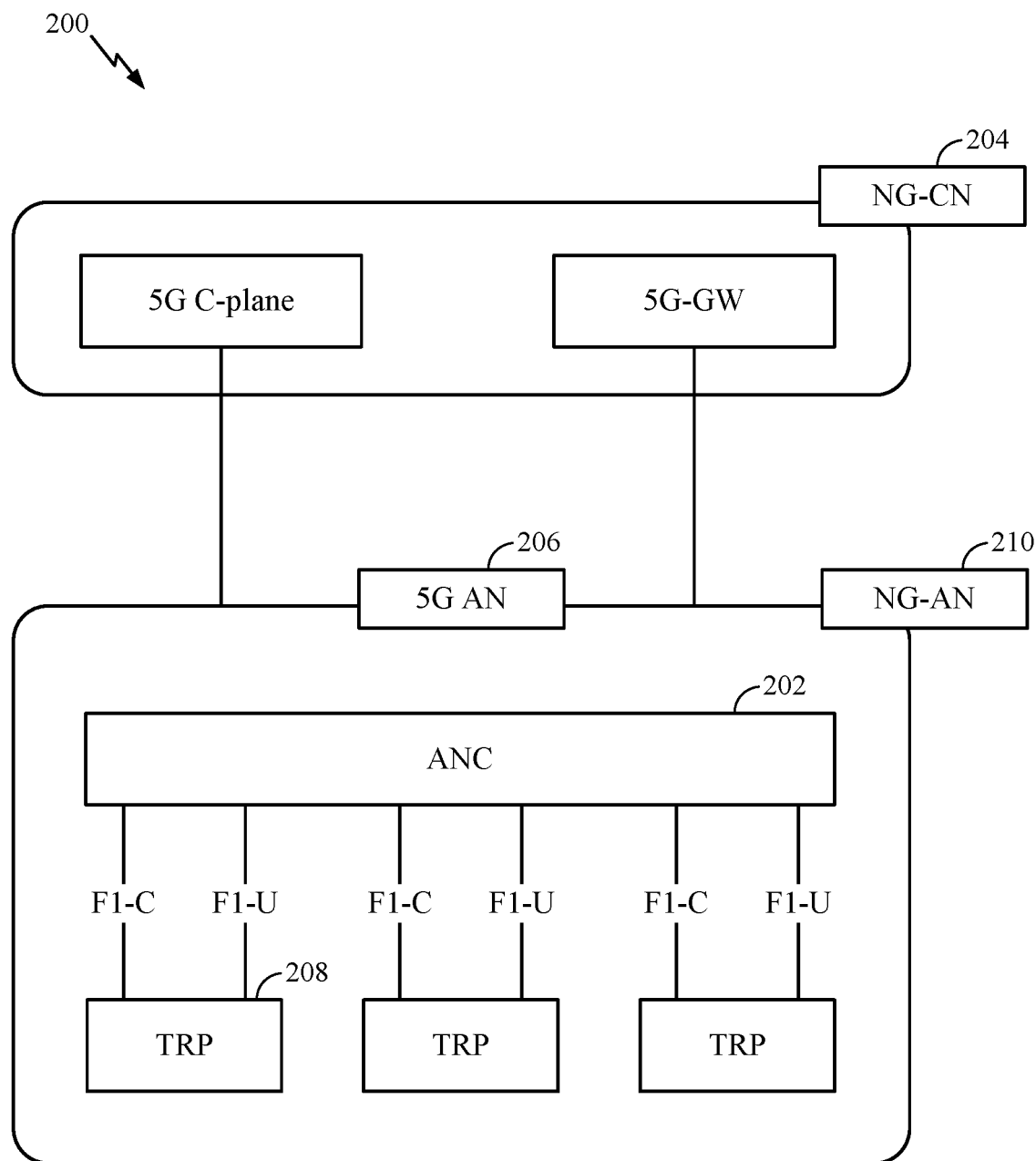
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
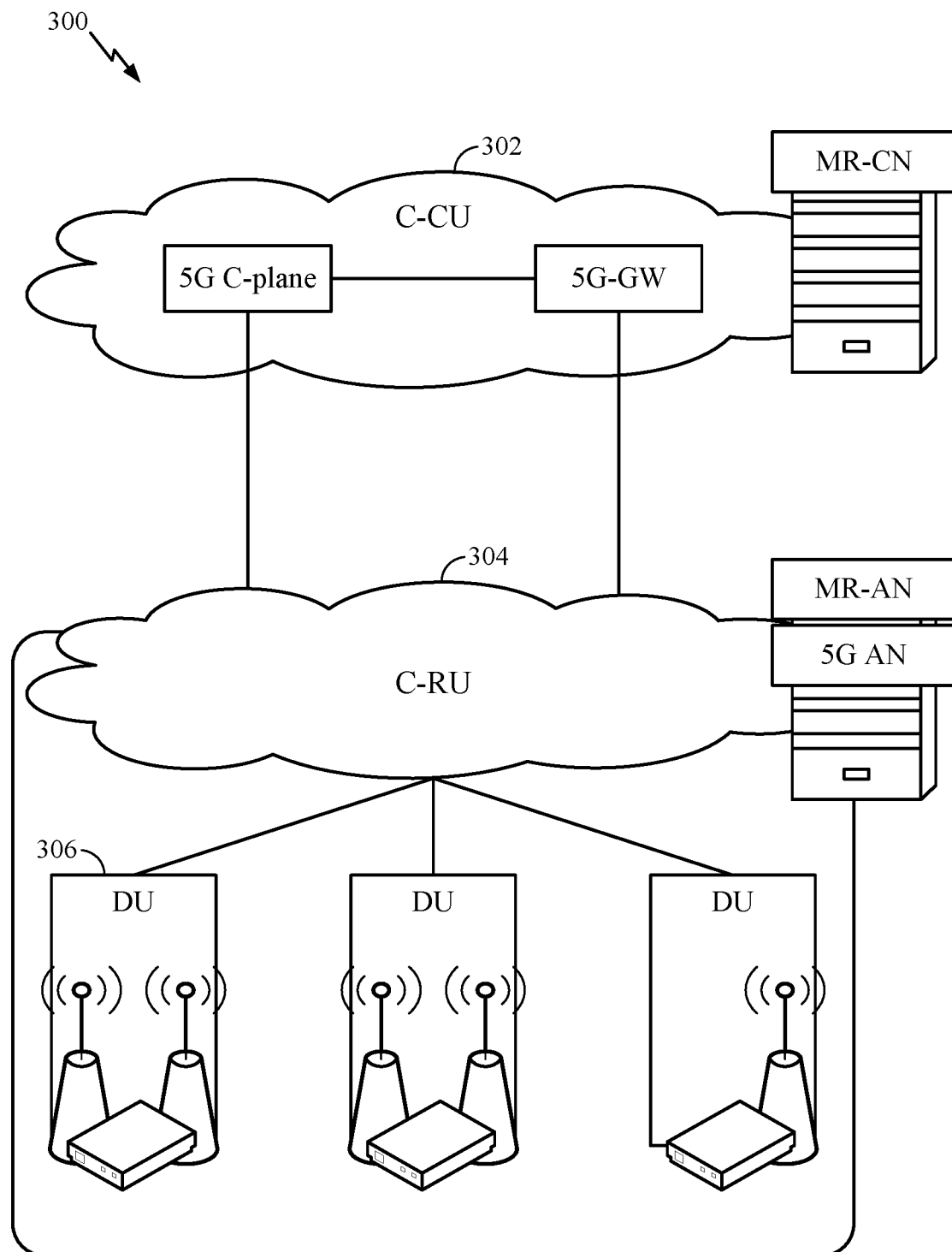
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
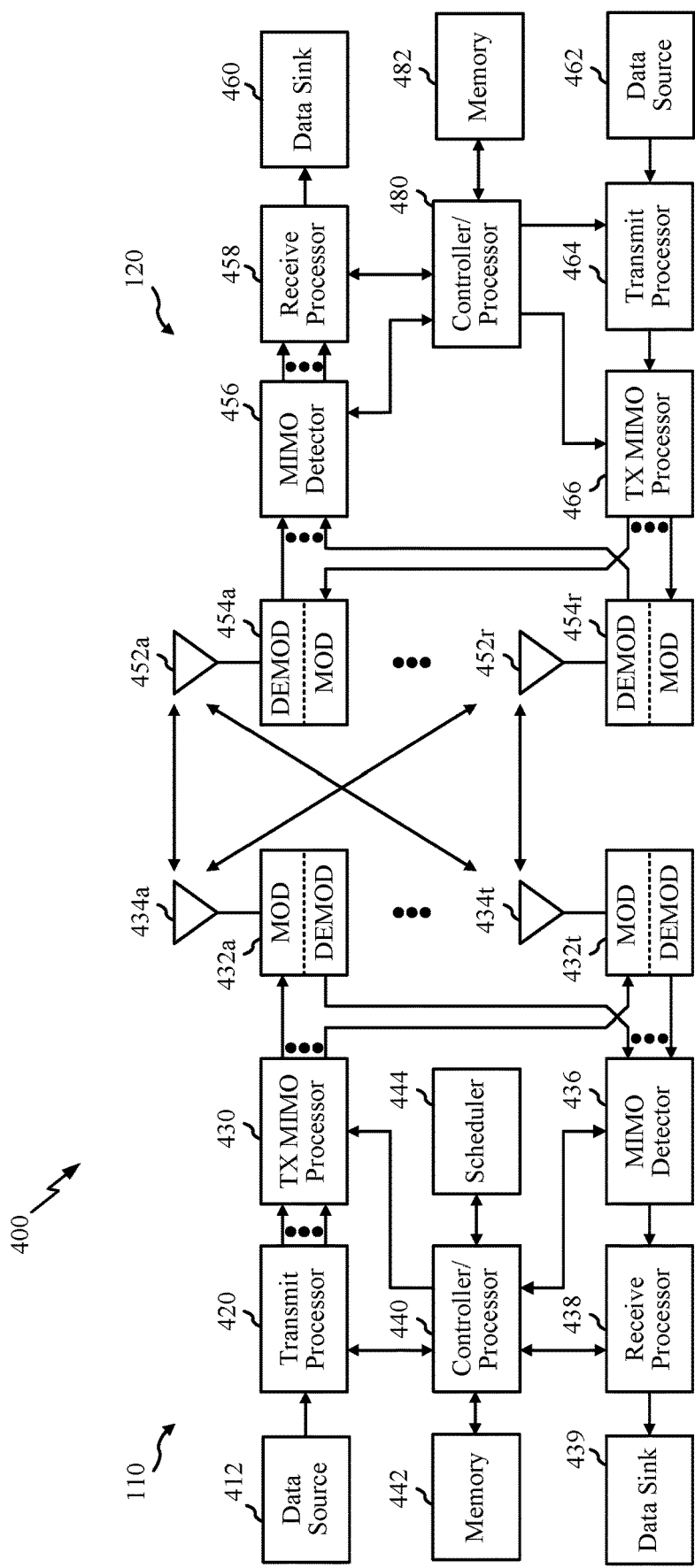
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9 and 15.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE- MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, and/or other processes for the techniques described herein. The processor 480 and/or other processors and modules at the UE 120 may also perform or direct processes for the techniques described herein in relation to FIGS. 9 and 15. The memories 442 and 482 may store data and program codes for the BS 110 and the UE 120, respectively. A scheduler 444 may schedule UEs for data transmission on the downlink and/or uplink.

Figure 5:
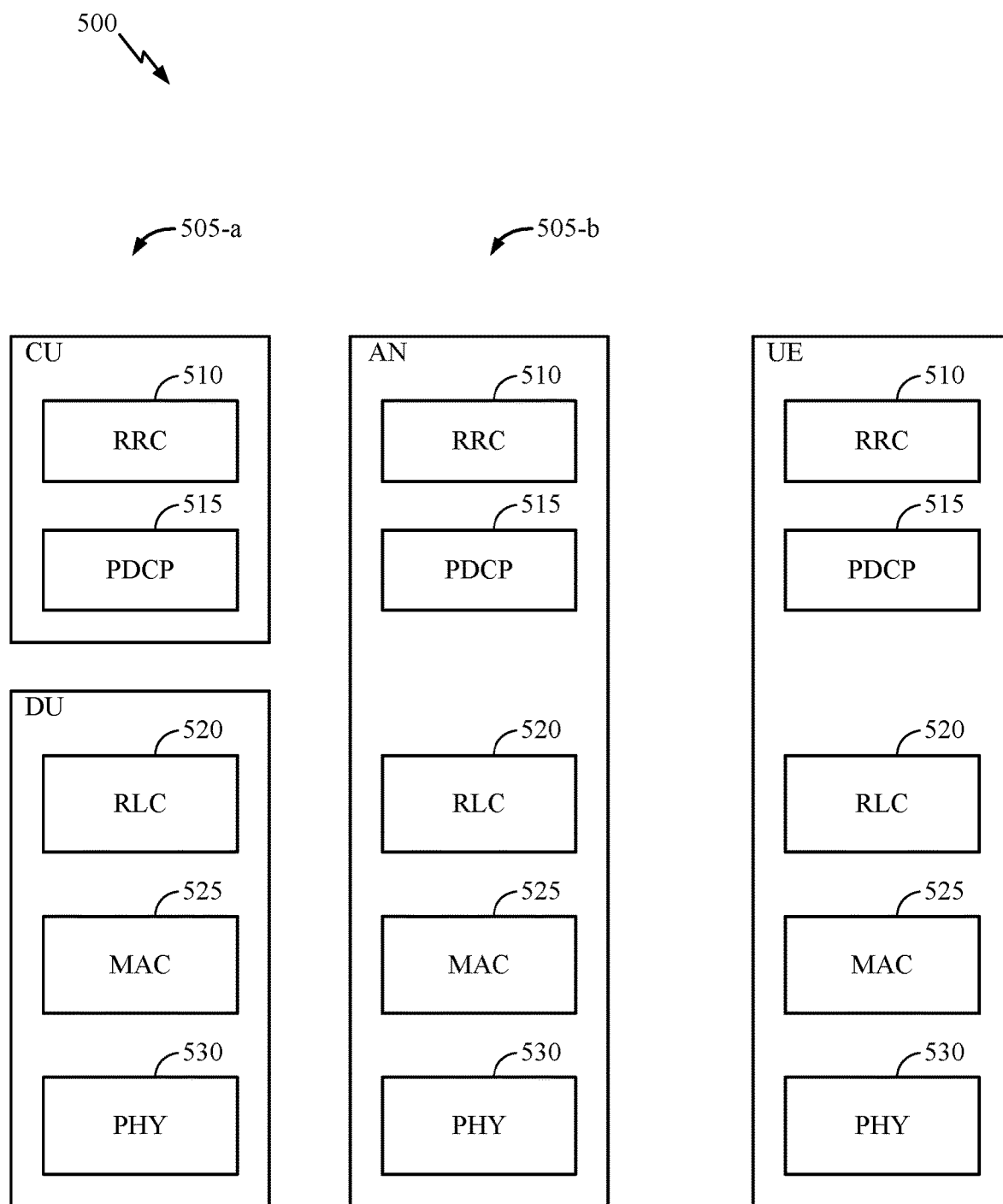
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
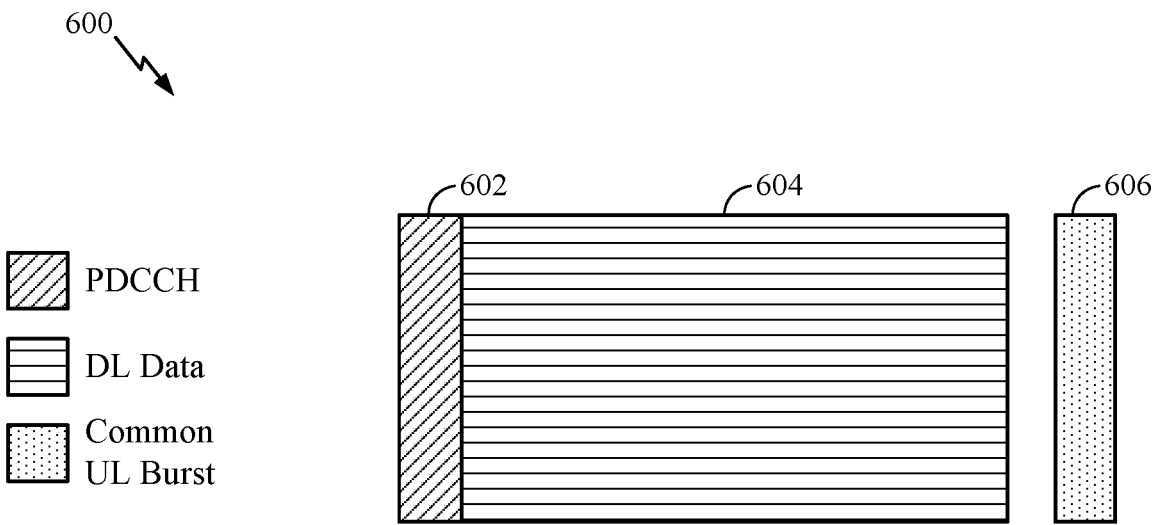
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
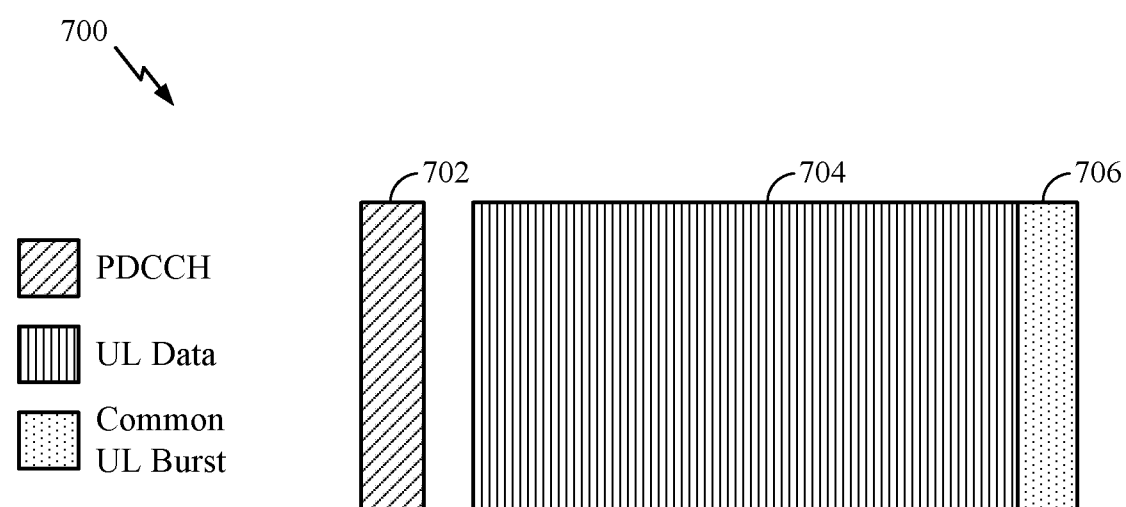
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Slot Design

In mobile communication systems conforming to certain wireless communications standards, such as the Long Term Evolution (LTE) standards, certain techniques may be used to increase the reliability of data transmission. For example, after a base station performs an initial transmission operation for a specific data channel, a receiver receiving the transmission attempts to demodulate the data channel during which the receiver performs a cyclic redundancy check (CRC) for the data channel. If, as a result of the check, the initial transmission is successfully demodulated, the receiver may send an acknowledgement (ACK) to the base station to acknowledge the successful demodulation. If, however, the initial transmission is not successfully demodulated, the receiver may send a non-acknowledgement (NACK) to the base station. A channel that transmits ACK/NACK is called a response or an ACK channel.

In some cases, under the LTE standards, an ACK channel may comprise two slots (i.e. one subframe) or 14 symbols, which may be used to transmit an ACK that may comprise one or two bits of information. In some cases, when transmitting ACK channel information, a wireless device may perform frequency hopping. Frequency hopping refers to the practice of repeatedly switching frequencies within a frequency band in order to reduce interference and avoid interception.

Figure 8A:
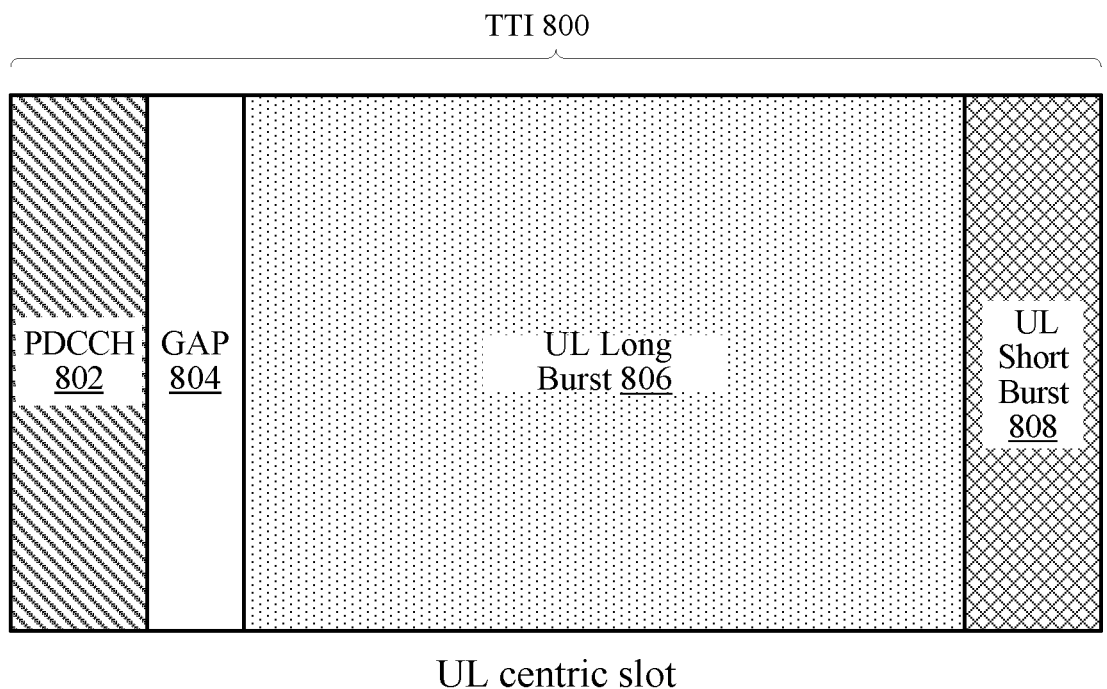
FIGS. 8a and 8b illustrate example uplink and downlink structures, respectively, in accordance with certain aspects of the present disclosure.

Under other wireless communications standards, such as NR, the ACK channel information as well as other information may be transmitted through an uplink structure shown in FIG. 8a. FIG. 8a illustrates an example uplink structure with a transmission time interval (TTI) 800 that includes a region 806 for long uplink burst transmissions (shown as "UL Long Burst 806"). UL Long Burst (ULLB) 806 may transmit information such as ACK, channel quality indicator (CQI), or scheduling request (SR) information.

Figure 8B:
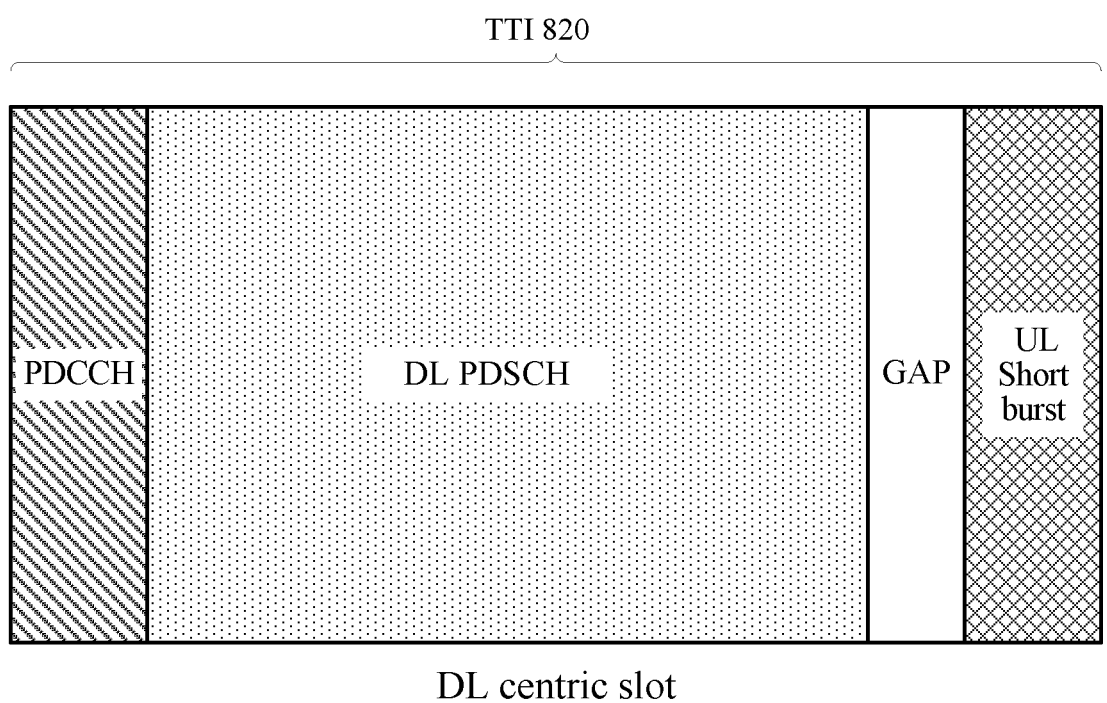

The duration of ULLB 806 may vary depending on how many symbols are used for the physical downlink control channel (PDCCH) 802, the gap 804, and the short uplink burst (shown as UL Short Burst (ULSB) 808), as shown in FIG. 8. For example, UL Long Burst 806 may comprise a number of slots (e.g., 4), where the duration of each slot may vary from 4 to 14 symbols. FIG. 8b also shows a downlink structure having a TTI 820 that includes PDCCH, downlink physical downlink shared channel (PDSCH), a gap, and an ULSB. Similar to the ULLB, the duration of the DL PDSCH may also depend on the number of symbols used by the PDCCH, the gap, and the ULSB.

Example Uplink Control Information (UCI) in Short Duration

As noted above, the ULSB region (e.g., ULSB 808) may be 1 or 2 symbols and different approaches may be used to transmit UCI in this duration. For example, according to a "1 symbol" UCI design, 3 or more bits of UCI may be sent using frequency division multiplexing (FDM). For 1 or 2 bits of ACK (which may indicate an acknowledgement or a lack of acknowledgement) and/or a 1 bit scheduling request (SR), a bit-sequence-based design may be used. For example, an SR may be sent with 1 bit-sequence, on-off keying, and may multiplex up to 12 users per RB. For a 1-bit ACK, 2 bit-sequences may be used, and up to 6 users may be multiplexed per RB. For a 2-bit ACK, 4 bit-sequences may be used and up to 3 users may be multiplexed per RB.

Generally, assigned ACK and SR RBs are not adjacent to each other. When both are required to be transmitted simultaneously, if each individual channel uses the same design, a few issues may result. One is an inter-modulation (IMD) issue caused by non-consecutive RB transmissions. The other is an issue relating to the increased peak-to-average power ration (PAPR). Aspects of the present disclosure provide techniques for transmitting UCI that has different types of information, for example, 1 or 2 bits of ACK and SR. In certain aspects, the techniques described herein relate to combining ACK and SR bits into a joint payload and transmitting the joint payload in the same RB resulting in a low PAPR sequence and minimized IMD.

Figure 9:
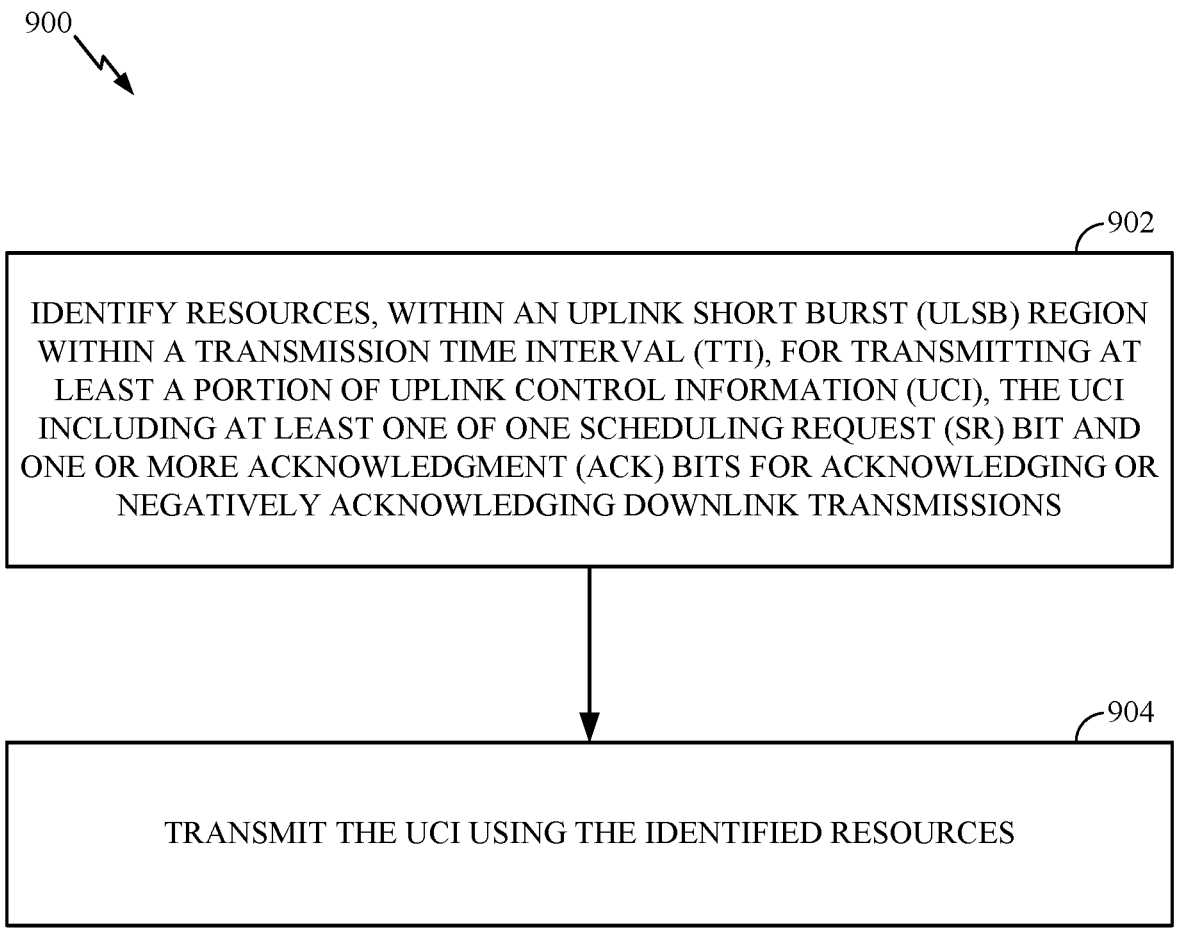
FIG. 9 illustrates example operations for wireless communications by a transmitter, according to aspects of the present disclosure.

FIG. 9 illustrates example operations 900 for wireless communications by a transmitter, according to aspects of the present disclosure. Operations 900 may be performed, for example, by a UE (e.g., UE 120).

Operations 900 begin, at 902, by identifying resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions. At 904, the transmitter transmits the UCI using the identified resources.

Figure 9A:
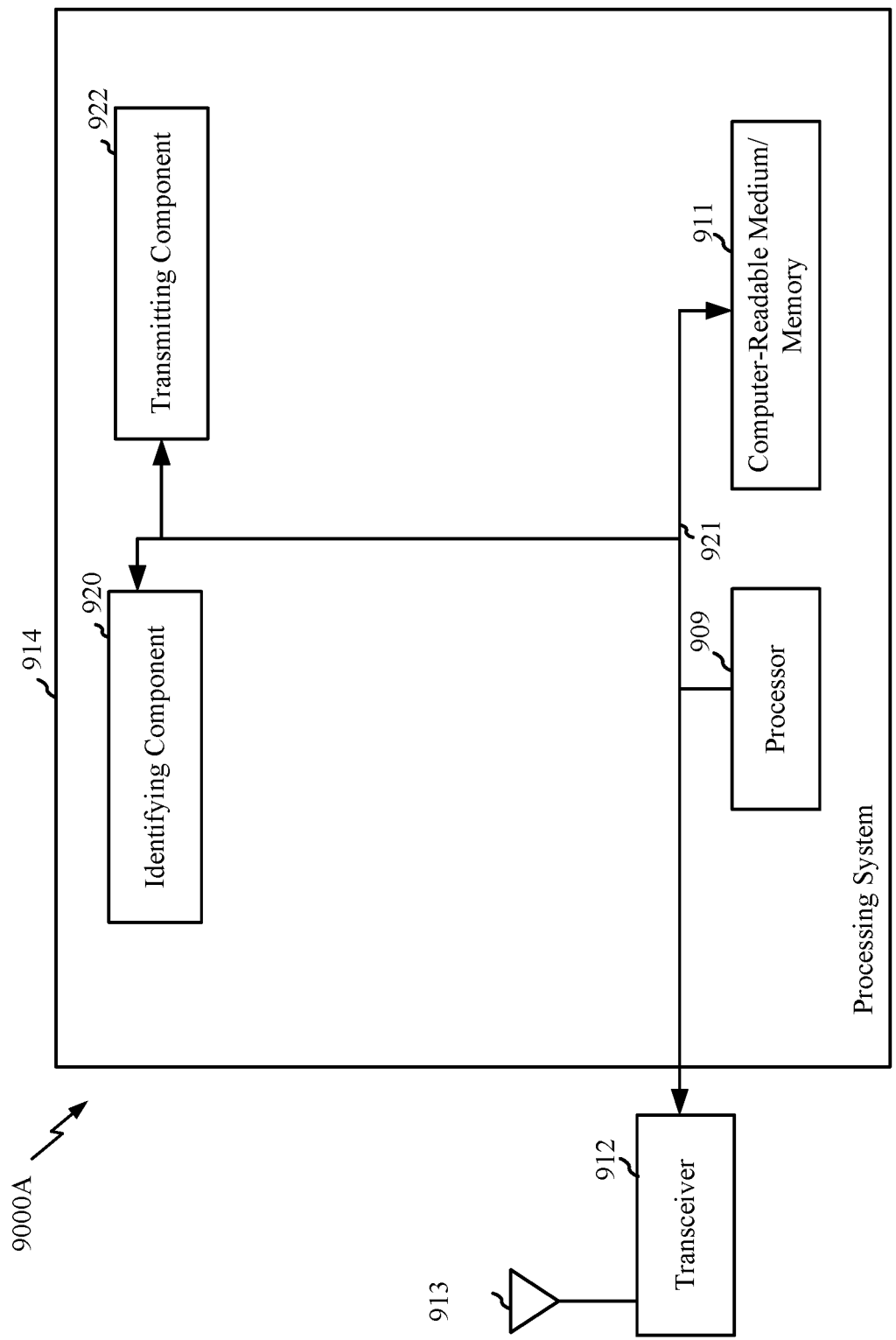
FIG. 9A illustrates a wireless communications device that may include various components configured to perform operations for the techniques disclosed herein, such as one or more of the operations illustrated in FIG. 9.

FIG. 9A illustrates a wireless communications device 900A that may include various components (e.g., corresponding to means-plus-function components) configured to perform operations for the techniques disclosed herein, such as one or more of the operations illustrated in FIG. 9. The communications device 900A includes a processing system 914 coupled to a transceiver 912. The transceiver 912 is configured to transmit and receive signals for the communications device 900A via an antenna 913. The processing system 914 may be configured to perform processing functions for the communications device 900A, such as processing signals, etc.

The processing system 914 includes a processor 909 coupled to a computer-readable medium/memory 911 via a bus 921. In certain aspects, the computer-readable medium/memory 911 is configured to store instructions that when executed by processor 909, cause the processor 909 to perform one or more of the operations illustrated in FIG. 9, or other operations for performing the various techniques discussed herein.

In certain aspects, the processing system 914 further includes an identifying component 920 for performing one or more of the operations illustrated at 902 in FIG. 9. Additionally, the processing system 914 includes a transmitting component 922 for performing one or more of the operations illustrated at 904 in FIG. 9.

The identifying component 920 and the transmitting component 922 may be coupled to the processor 909 via bus 921. In certain aspects, the identifying component 920 and the transmitting component 922 may be hardware circuits. In certain aspects, the identifying component 920 and the transmitting component 922 may be software components that are executed and run on processor 909.

Figure 10:
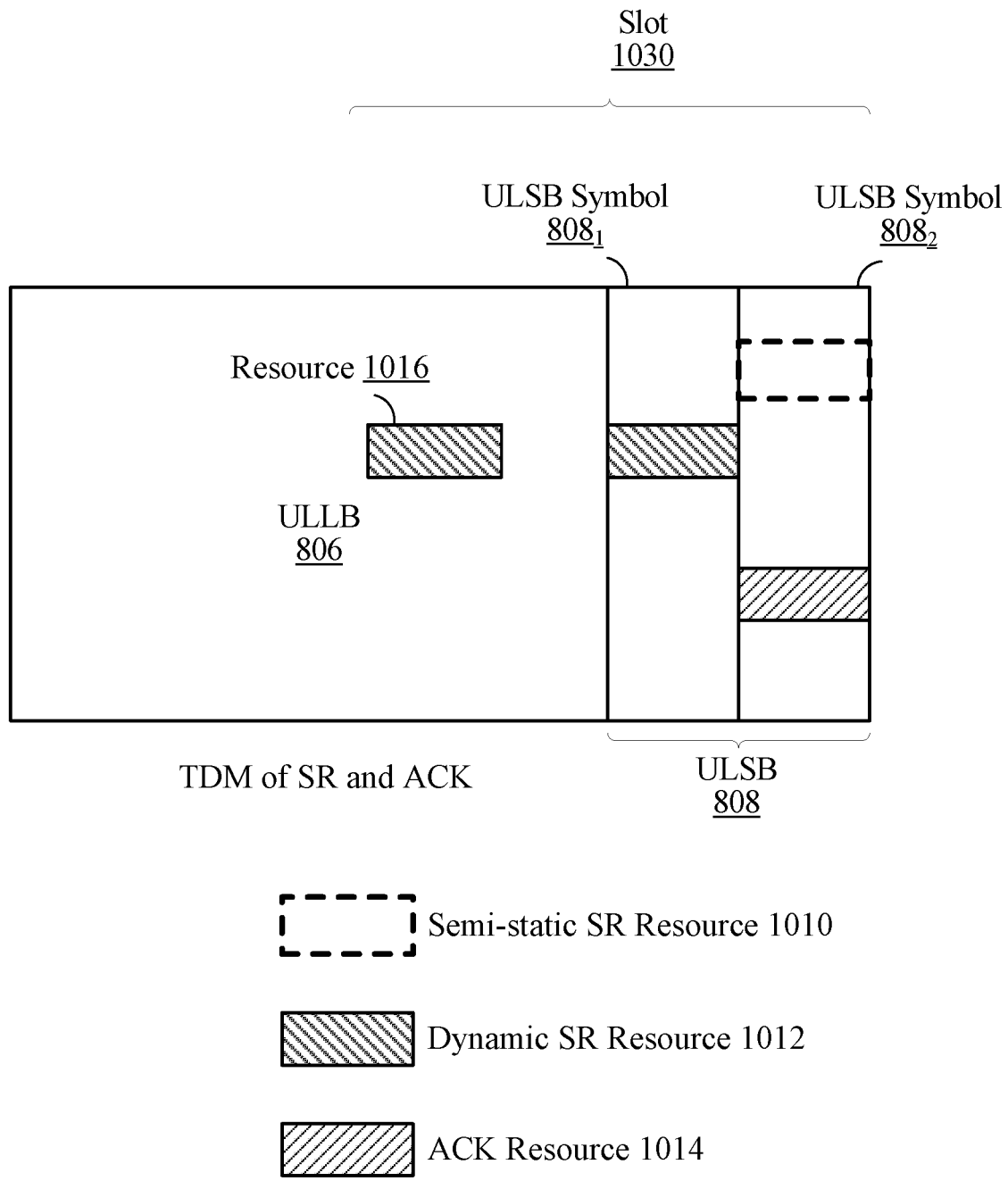
FIG. 10 illustrates an example of transmitting UCI using time division multiplexing (TDM), in accordance with certain aspects of the present disclosure.

As illustrated in FIG. 10, in some aspects, SR and ACK bits may be sent in ULSB 808 using time division multiplexing. In some aspects, SR may be semi-statically configured (e.g., semi-static SR resource 1010) for transmission on a certain ULSB time resource (e.g., ULSB symbol $808_2$). Because SR is normally not delay sensitive (e.g., for enhanced mobile broadband (eMBB)), however, when SR needs to be sent together with ACK on the same short PUCCH symbol (e.g., ULSB symbol $808_2$), SR may be rescheduled from the semi-statically scheduled SR resource 1010 on the ULSB symbol $808_2$ to a different symbol with DCI. In other words, the need to send ACK with SR may override the semi-static SR resource 1010 (e.g., the UE may skip transmitting SR on the original semi-static SR resource 1010).

In some aspects, the BS (e.g., 110) may reconfigure the semi-static SR resource 1010 if it envisions a constant transmission of SR and ACK on the same symbol (e.g., ULSB symbol $808_2$). For example, the BS may configure the UE for a semi-persistent self-contained transmission (constant ACK on short duration) with a 1 symbol short duration.

As shown in FIG. 10, dynamic SR (e.g., SR that is scheduled dynamically) may use a resource (e.g., dynamic SR resource 1012) that is on a different symbol (e.g., ULSB symbol $808_1$) in the short duration (e.g., ULSB 808) of a current slot (e.g., slot 1030, which may be half the duration of TTI 800 of FIG. 8A) or may be scheduled for a same or different symbol in the short duration of a later slot (e.g., a lot after slot 1030). In some cases, the dynamic SR may use a resource (e.g., resource 1016) in the long duration (e.g., ULLB 806) in a current slot (e.g., slot 1030) and/or a long SR may be sent as a short SR with repetition. In certain aspects, SR may also have time domain spreading across multiple symbols and may only occupy a subset of the long duration (e.g., ULLB 806) of a current slot (e.g., slot 1030) or a later slot.

In some cases, the resource selection may be based on a value of the SR bit (e.g., one RB for a negative SR (SR=0), another RB for a positive SR (SR=1), or one set of sequences for a negative SR, another set of sequences for a positive SR.). For each RB, a UE may use a normal sequence-based ACK transmission (e.g., 2 bit-sequences for 1 ACK bit or 4 bit-sequences for 2 ACK bits).

Figure 11A:
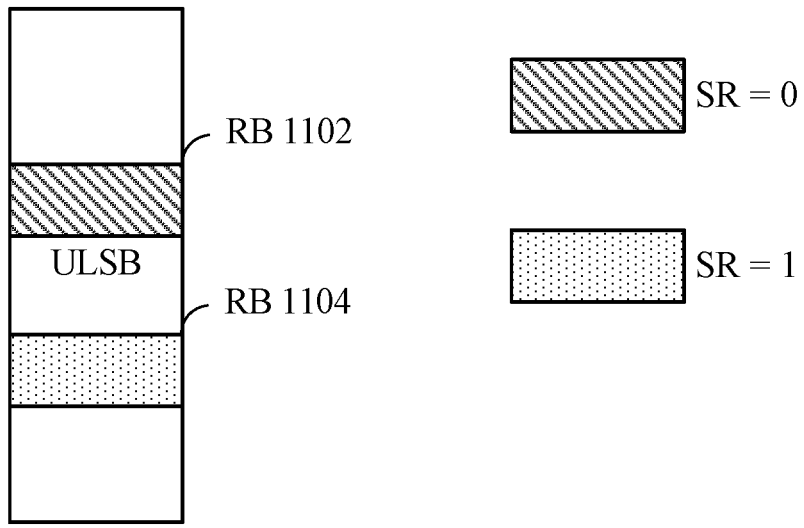
FIGS. 11a and 11b illustrate examples of transmitting UCI in a short duration, in accordance with certain aspects of the present disclosure.
Figure 12A:
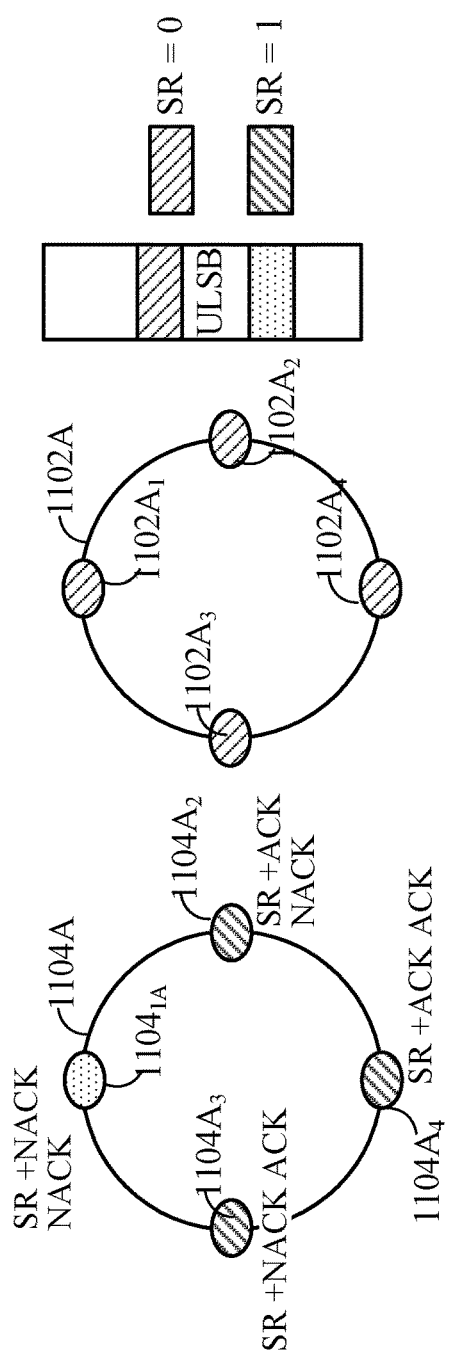
FIGS. 12a and 12b illustrate resources corresponding to the examples shown in FIGS. 11a and 11b, respectively, according to aspects of the present disclosure.

As illustrated in FIG. 11A, according to one technique (labeled technique 2A), an RB 1104 for SR=1 may be the same as an original SR RB (e.g., the semi-static resource 1010). As illustrated in FIG. 12A, this technique may utilize 8 resources (e.g., 4 sequences*2 RBs) for 2 bits of ACK plus SR. In this manner, this technique may use more resources for SR-only transmissions (2 or 4 bit-sequences). These bit sequences may each have different cyclic shifts. FIG. 12A illustrates circular representations of RBs 1102A and 1104A, each of which comprises a number of bit-sequences. RB 1102A comprises 4 bit-sequences $1102A_1$-$1102A_4$ for carrying a negative SR as well as ACK bits. RB 1104A comprises 4 bit-sequences for carrying a positive SR as well as ACK bits. For example, RB 1104A comprises bit-sequences for indicating a positive SR as well as two ACK bits. Each bit-sequence represents a different acknowledgement scenario.

For example, bit-sequence $1104A_1$ may indicate a positive SR and two ACK bits corresponding to two non-acknowledgements (e.g., one per codeword). This bit sequence is shown different than bit sequences $1104A_2$-$1104A_4$, because this sequence is the same as an SR-only bit sequence (e.g., when ACK/NACK is DTX). As such, with respect bit sequence $1104A_1$, the BS is not able to differentiate if the bit sequence is a SR+DTX or SR+ NACK/NACK bit sequence (e.g., the BS is not able to perform DTX detection. This is, for example, different from bit sequence $1104B_1$, where the bit sequence is in a different RB than the other bit sequences, enabling the BS to perform DTX detection.

Moving now to bit-sequence $1104A_2$, bit-sequence $1104A_2$ may indicate a positive SR and two ACK bits corresponding to one acknowledgment relating to one codeword and a non-acknowledgement relating to the other codeword. Bit-sequence $1104A_3$ may indicate a positive SR and two ACK bits corresponding to one non-acknowledgment relating to one codeword and an acknowledgement relating to the other codeword. Bit-sequence $1104A_4$ may indicate a positive SR and two ACK bits corresponding to two one acknowledgments. As shown, in certain aspects, bit-sequences $1104A_2$ and $1104A_3$ may be allocated to a 1-bit ACK or reserved when SR is transmitted alone. Also, in certain aspects, $1104A_4$ may be reserved even when SR is transmitted alone.

Figure 11B:
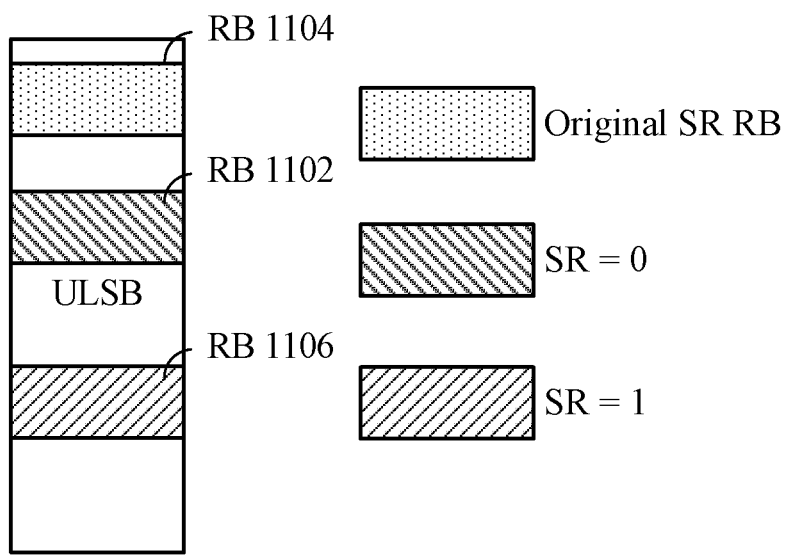
Figure 12B:
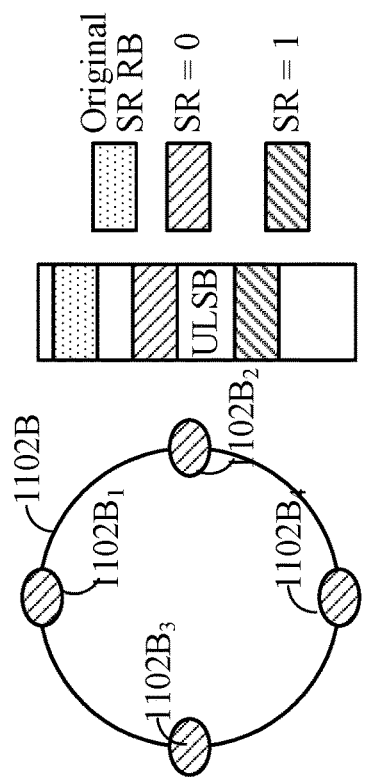
Figure 12B:
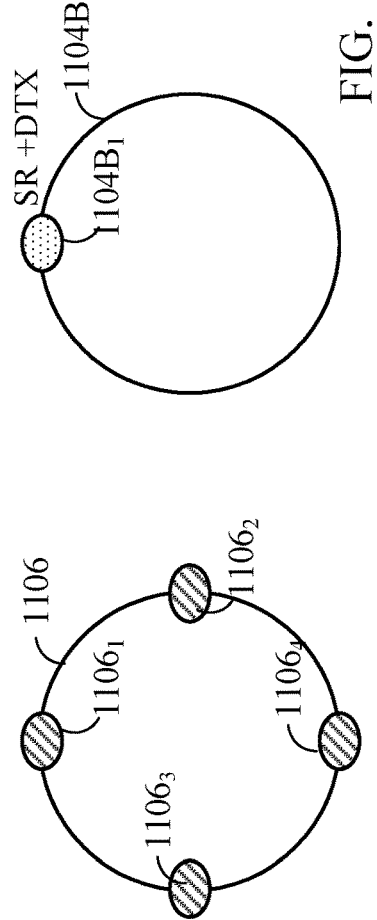

As illustrated in FIG. 11B, according to another technique (labeled technique 2B), the RB (e.g., RB 1106) used for a positive SR (SR=1) may be different than an original SR RB 1104 (e.g., the semi-static resource 1010). As illustrated in FIG. 12B, technique 2B may utilize 9 resources for 2 bits of ACK+SR (e.g., 1 bit-sequence in RB 1104B for SR+ DTX (discontinuous transmission) and 4 bit-sequences*2 for 2 bits of ACK+SR) or 5 resources for 1 bit of ACK+SR (e.g., 1 bit-sequence in RB 1104B for SR+DTX (discontinuous transmission) and 2 bit-sequences*2 for 1 bit of ACK+SR). For an example with 2 bits of ACK+SR, as shown, RB 1102B comprises four bit-sequences $1102B_1$-$1102B_4$ and RB 1106 comprises four bit-sequences $1106_1$-$1106_4$, while RB 1104B comprises 1 bit-sequence $1104B_1$. In certain aspects, one or more bit-sequences may be derived from the same base bit-sequence with different cyclic shifts. As used herein, DTX refers to a discontinuous transmission (e.g., when the UE did not detect anything and, therefore, has no ACK/NACK information to send). As illustrated in FIG. 12B, technique 2B may need only 1 resource for an SR-only transmission (e.g., 1 bit-sequence $1104B_1$ in RB 1104B). Technique 2B may allow for detection of DTX when SR=1 (e.g., if SR=1 is detected in original SR resource (e.g., RB 1104B corresponding to semi-static SR resource 1010 of FIG. 10), this may be considered a DTX+SR=1 indication). In both technique 2A and technique 2B, if no bit-sequence is detected in all resources, this may be considered as DTX+SR=0

In certain aspects, the UE may identify one RB for transmitting a SR bit as well as one or more ACK bits (e.g., RBs 1106 or 1102B in FIG. 12B) when there are ACK bits to transmit. The selection of this RB may depend on the value of the SR bit (e.g., where SR is positive or negative). However, when there are no ACK bits to transmits, the UE may identify a different RB for transmitting an SR bit without any ACK bits (e.g., RB 1104B).

In cases where there are ACK bits to transmits and an RB is selected for the transmission of the SR bit and the one or more ACK bits, the sequence-base design described above is used to transmit the SR bit and the one or more ACK bits. For example, as described above, when ACK is only 1 bit, two bit-sequences may be identified to convey the ACK bit and a positive SR and another two bit-sequences may be identified to convey the ACK bit and a negative SR. In another example, as described above, when ACK is 2 bits, four bit-sequences may be identified to convey the ACK bit and a positive SR (e.g., SR=1 and ACK-NACK, ACK-ACK, NACK-ACK, and NACK-NACK) and another four bit-sequences may be identified to convey the ACK bit and a negative SR (e.g., SR=0 and ACK-NACK, ACK-ACK, NACK-ACK, and NACK-NACK).

As described above, in some aspects, when there are no ACK bits (e.g., DTX: when the UE did not detect anything and, therefore, has no ACK/NACK information to send), the UE may identify an RB (e.g., RB 1104B) that uses only 1 sequence to transmit an SR without any ACK bits. In certain aspects, the SR transmitted on RB 1104B may be positive.

Figure 13:
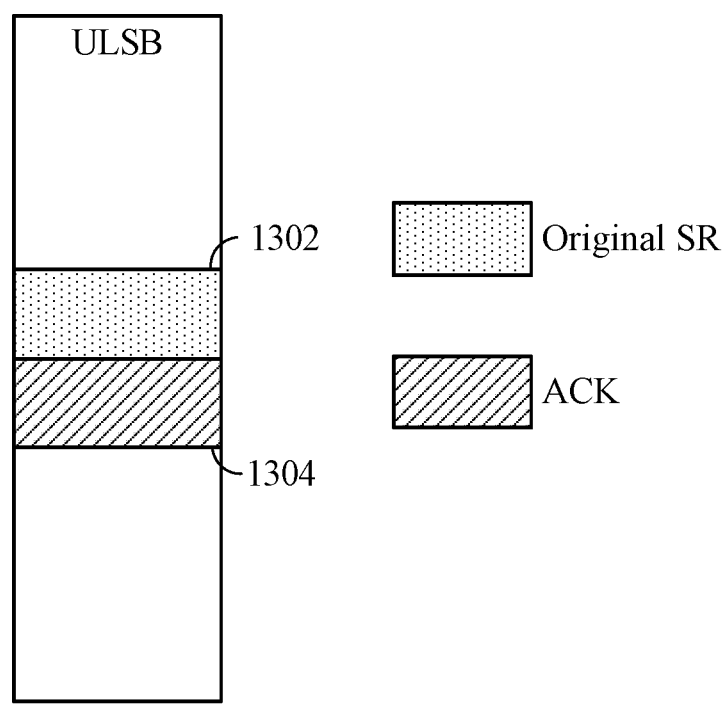
FIG. 13 illustrates an example of transmitting UCI using frequency division multiplexing (FDM), in accordance with certain aspects of the present disclosure.

As illustrated in FIG. 13, in some cases UCI (SR and ACK) may be sent via parallel transmissions with adjacent RBs (e.g., FDM'd in the same symbol). For example, adjacent RBs 1302 and 1304 may be used for the transmission of UCI in the same ULSB symbol. Using such a technique may lead to no intermodulation leakage, low (peak to average power ratio (PAPR), and relatively simple transmit and receive processing. This technique may, however, result in power splitting between SR and ACK bits, which may have the potential for performance loss compared to individual transmissions. Such a performance may be acceptable, for example, if the UE is not link budget limited.

In some aspects, however, this technique (FDM of SR and ACK in the same symbol as shown in FIG. 13) may be power headroom (PHR) dependent. For example, if a latest PHR report is available at both the UE and the BS and the latest PHR indicates a power that is at least some threshold (e.g., X dB) below max power (e.g., X=6 dB), the UE may use parallel transmission (technique shown in FIG. 13). In other words, if the PHR is above a threshold value, the UE may use parallel transmission. On the other hand, if the latest PHR indicates a power that is less than X dB from max power (e.g., if the PHR is below a threshold value), the UE may use a bundled ACK. For example, in such aspects, the UE may combine 2 bits of ACK into 1 bit and transmit with SR on ACK resources (e.g., using 4 bit-sequences in 1 RB).

There are various options, if power splitting is performed for parallel transmission of SR and ACK. For example, if SR=0, all power could be allocated to ACK. On the other hand, if SR=1: Y % of power may be allocated to SR, while 1–Y % of power may be allocated to a 2 bit ACK. Y may be chosen depending on a goal, for example, as follows:
Y=50: equal power split on SR and ACK;
Y=33.3: ⅓ on SR, ⅔ on ACK resulting in a same power per bit;
Y=0: drop SR; or
Y=100: drop ACK.

FIG. 14A illustrates another technique for transmitting UCI in the ULSB region. In certain aspects, this technique may be used for a 2-bit ACK with resource selection, which may avoid the need to power split between the 2 bits of ACK. Using this technique, the $2^{nd}$ bit of ACK may be transmitted with 2 bit-sequences on one RB for a first value of the $1^{st}$ bit of ACK, (e.g., $1^{st}$ ACK=0), and on another RB for a second value of the $1^{st}$ bit of ACK (e.g., $1^{st}$ ACK=1). For example, RB 1402A comprises two bit-sequences for the first bit of ACK having a value of 1 and RB 1404A comprises two bit-sequences for the first bit of ACK having a value of 1.

FIG. 14B illustrates another example, similar to FIG. 12B, where SR may be transmitted in a manner that allows for a DTX indication. For example, RB 1402B comprises four bit-sequences for a first bit of ACK having a value of 0. The four bit-sequences of RB 1402B include two bit-sequences for a negative SR and two bit-sequences for a positive SR.

RB 1404B comprises four bit-sequences for a first bit of ACK having a value of 1. The four bit-sequences of 1404B include two bit-sequences for a negative SR and two bit-sequences for a positive SR. RB 1406 includes a bit-sequence for SR+DTX.

In some cases, different UEs may have different ULLB durations. According to certain aspects of the present disclosure, the ULLB regions of different UEs may be multiplexed in the same RB with different long durations.

Figure 15:
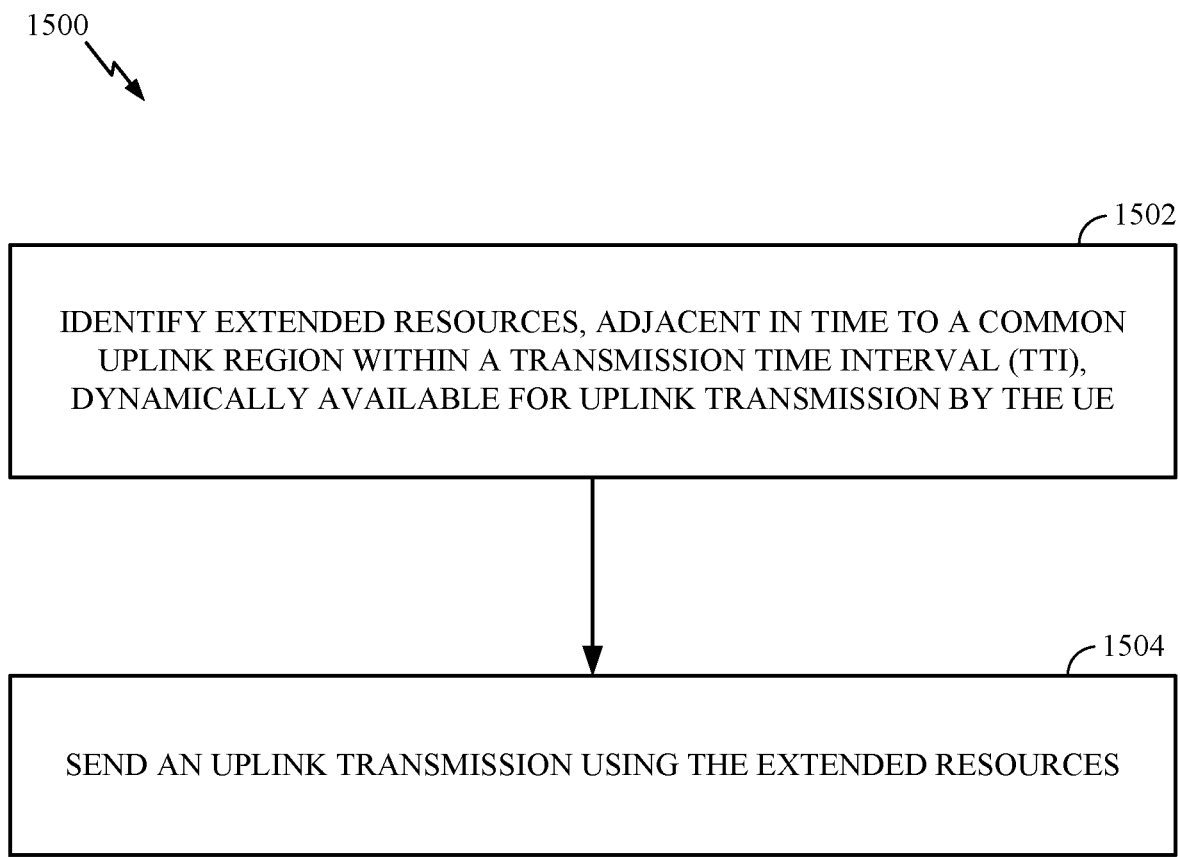
FIG. 15 illustrates example operations for wireless communications by a UE, according to aspects of the present disclosure.

FIG. 15 illustrates example operations 1500 for wireless communications by a transmitter, according to aspects of the present disclosure. Operations 1500 may be performed, for example, by a UE. The UEs are multiplexed in the same RB with different duration. There is a common uplink region which is the overlapped part between the UEs. There is also an extra region from the UEs with longer duration. The extra region may be present on either side of the common region or both sides.

Operations 1500 begin, at 1502, by identifying extended resources, adjacent in time to a common uplink region within a transmission time interval (TTI), dynamically available for uplink transmission by the UE. At 1504, the transmitter sends an uplink transmission using the extended resources.

Figure 15A:
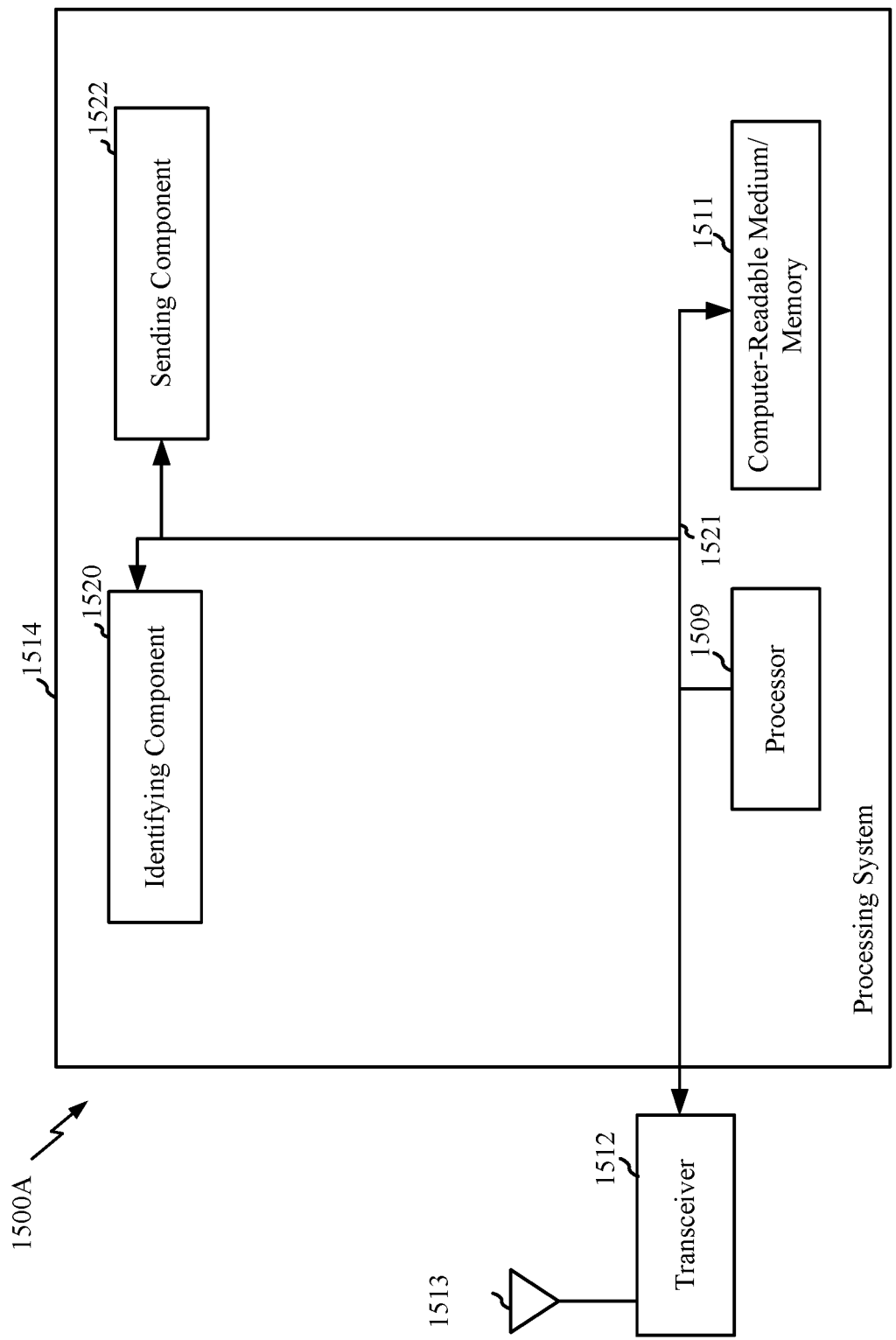
FIG. 15A illustrates a wireless communications device that may include various components configured to perform operations for the techniques disclosed herein, such as one or more of the operations illustrated in FIG. 15.

FIG. 15A illustrates a wireless communications device 1500A that may include various components (e.g., corresponding to means-plus-function components) configured to perform operations for the techniques disclosed herein, such as one or more of the operations illustrated in FIG. 15. The communications device 1500A includes a processing system 1514 coupled to a transceiver 1512. The transceiver 1512 is configured to transmit and receive signals for the communications device 1500A via an antenna 1513. The processing system 1514 may be configured to perform processing functions for the communications device 1500A, such as processing signals, etc.

The processing system 1514 includes a processor 1509 coupled to a computer-readable medium/memory 1511 via a bus 1521. In certain aspects, the computer-readable medium/memory 1511 is configured to store instructions that when executed by processor 1509, cause the processor 1509 to perform one or more of the operations illustrated in FIG. 15, or other operations for performing the various techniques discussed herein.

In certain aspects, the processing system 1514 further includes an identifying component 1520 for performing one or more of the operations illustrated at 1502 in FIG. 15. Additionally, the processing system 1514 includes a sending component 1522 for performing one or more of the operations illustrated at 1504 in FIG. 15.

The identifying component 1520 and the sending component 1522 may be coupled to the processor 1509 via bus 1521. In certain aspects, the identifying component 1520 and the sending component 1522 may be hardware circuits. In certain aspects, the identifying component 1520 and the sending component 1522 may be software components that are executed and run on processor 1509.

Figure 16:
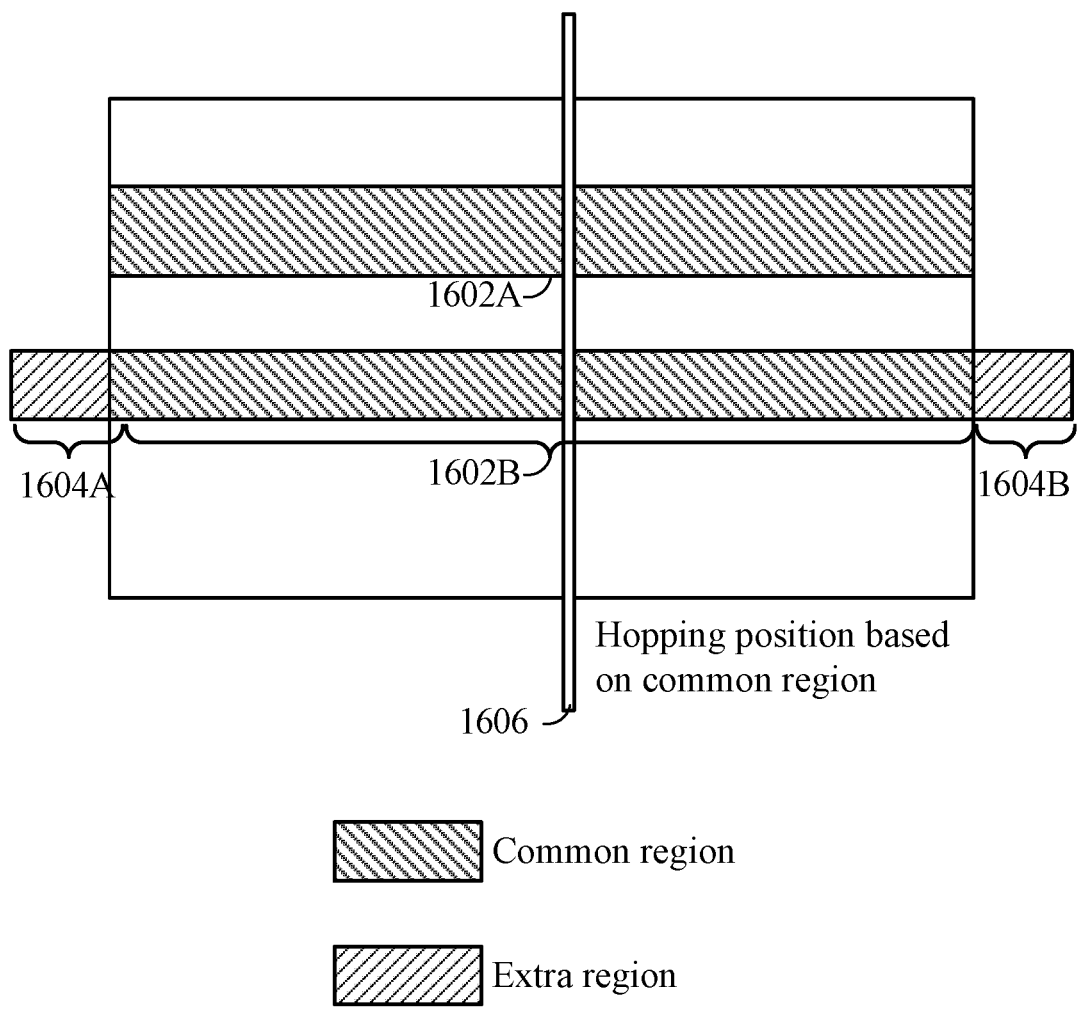
FIG. 16 illustrates an example of extended resources, in accordance with certain aspects of the present disclosure.

FIG. 16 illustrates an example of UE multiplexing for UEs with different ULLB durations. In some cases, different UEs may have different ULLB durations. For example, one UE may have a ULLB including only a common region 1602A. However, another UE may have a ULLB including two regions: a common region 1602B and an extra region 1604. Also, some UEs may support dynamic extension, while some may not support dynamic extension. In some cases, if time domain spreading is enabled, resources may be divided into code division multiplexing (CDM) groups into the two common and extra regions (e.g., common region 1602B and extra region 1604). Extra regions include extended resourced. For example, a common region 1602 may be used to ensure orthogonality and a first CDM group in this region may start at the same symbol at which the common region 1602 starts. For an extra region 1604, additional CDM groups may be defined (e.g., this may be only for UEs with extra region) and spreading may be disabled in this extra region 1604. In some cases, the hopping position 1606 for frequency hopping in the extra region 1604 may be calculated based on the common region 1602 (e.g., the extra region may hop together with the adjacent common region).

Figure 17:
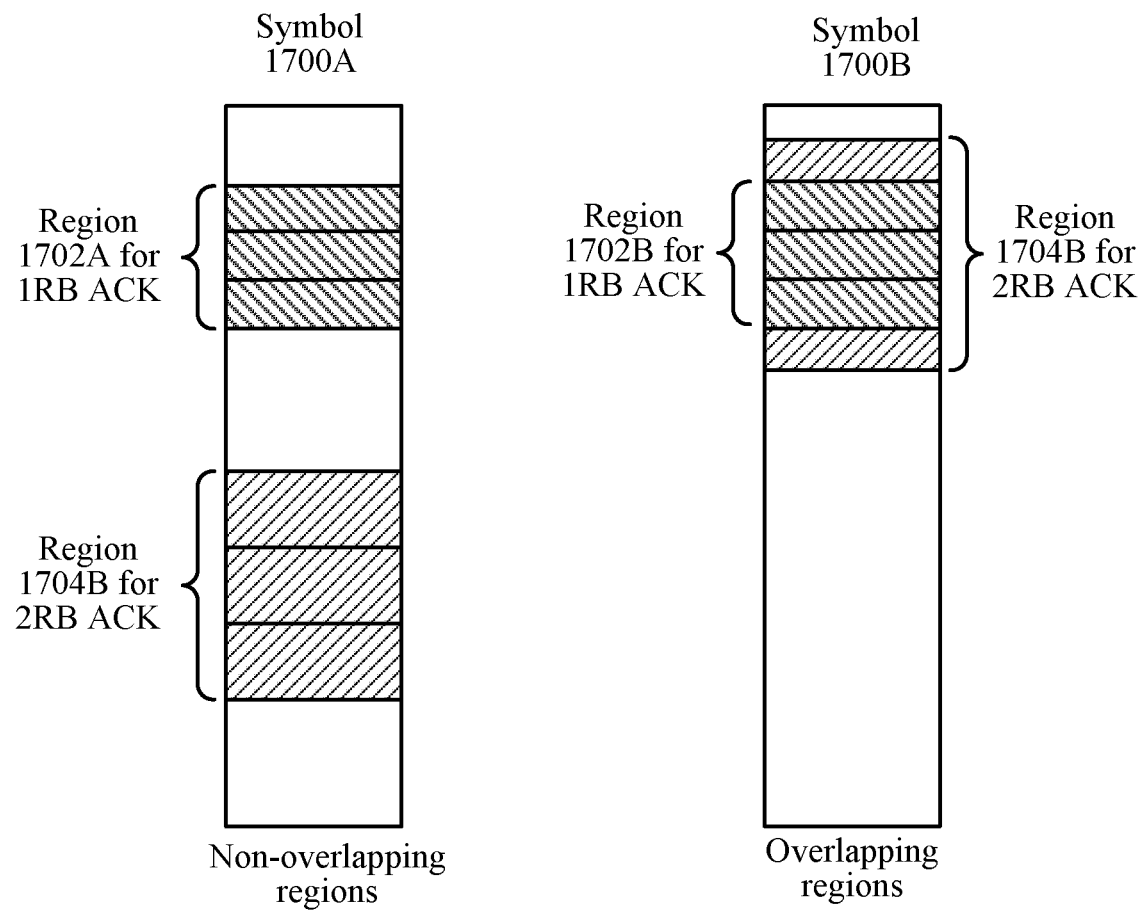
FIG. 17 illustrates an example of implicit resource mapping, in accordance with certain aspects of the present disclosure.

According to certain aspects of the present disclosure, ACK resources may be determined via an implicit mapping, as illustrated in FIG. 17. In NR, an ACK channel may have different payloads (e.g., 1 or 2 bits or 3 or more bits). In some cases, the number of ACK RBs may also range from 1 to multiple RBs. The resource region for 1 RB or more RBs may overlap or may be non-overlapping (as shown in FIG. 17). For example, in symbol 1700A, region 1702A for a 1-RB ACK is not overlapping with region 1704B for a 2-RB ACK. In another example, in symbol 1700B, region 1702B for a 1-RB ACK is overlapping with region 1704B for a 2-RB ACK.

In some cases, implicit mapping from PDCCH to ACK resources may help save DCI overhead. According to one technique, a UE may perform implicit mapping for 1 or 2 bits of ACK in the long (e.g., ULLB) and short (e.g., ULSB) durations with a 1-RB allocation only and perform explicit signaling for the rest of the ACK bits. In some cases, long ACK and short ACK may use different resource pools. For a long PUCCH, 1 or 2 ACK bits may use the same number of resources with different modulations, such that the mapping may not depend on payload size. For a short PUCCH, 1 or 2 ACK bits may use different number of resources (e.g., 1 bit may use 2 shifts, 2 bits may use 4 shifts), such that the mapping rule may depend on payload size. For a short PUCCH, the mapping may determine the first resource only, the rest of the resources (e.g., the second resource for 1 bit, and the other 3 resources for 2 bits) may be derived based on the first resource.

According to another technique, a UE may perform implicit mapping for 1 or 2 bits of ACK in the long and short durations with any number of RB allocations and perform explicit signaling for the rest of the ACK bits. The resource regions for different numbers of RBs may be overlapping or non-overlapping (e.g., FIG. 17). In some aspects, for non-overlapping regions, the number of RBs may be derived based on a mapping function. For overlapping regions, the number of RBs may be explicitly signaled and the mapping function may depend on the number of RBs allocated.

In some aspects, a UE may perform implicit mapping for any number of ACKs in the long and short durations with a 1-RB allocation only and perform explicit signaling for the rest of the ACK bits. In such aspects, the mapping function for performing the implicit mapping may be a function of payload size.

In some aspects, a UE may perform implicit mapping for any number of ACKs in the long and short durations with any number of RB allocations and perform explicit signaling for the rest of the ACK bits. In such aspects, the mapping function for performing the implicit mapping may be a function of a payload size and a number of RBs.

According to certain aspects of the present disclosure, there may be cell-specific and UE-specific long and short durations. In some aspects, cell specific short durations may be semi-statically configured (e.g., so all neighbor cells may configure the same short duration in the same slot to avoid mixed interference).

In some aspects, a cell specific long duration may be derived (e.g., as slot duration—semi-static cell-specific short duration—semi-static PDCCH duration—GAP). In such aspects, a cell specific PDCCH region may be semi-statically configured and the actual PDCCH region may be dynamically indicated with a control format indicator CFI.

In some aspects, a UE-specific short duration may be a subset of the cell specific short duration. For example, the cell specific short duration may be 2 symbols long while a UE specific short duration may be 1 symbol long. In some aspects, a UE specific short duration may not go beyond the cell-specific short duration in order to avoid mixed interference.

A UE-specific long duration may be a subset of the cell specific long duration. For example, a cell specific long duration may be 11 symbols, while a UE specific long duration may be 4 symbols.

In some cases, a UE-specific long duration extension may be available. According to one technique, there may be no dynamic extension, such that the UE specific long duration may not go beyond cell specific long duration. This may be controlled by the BS with a start/end symbol index. According to another technique, with dynamic extension, a UE specific long duration may go beyond cell specific long duration. This may be controlled by the BS with a start/end symbol index. The cell specific long duration may be used to determine the common region (e.g., common region 1602 shown in FIG. 16).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a transmitter, comprising:
    identifying resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions, wherein the SR bit and the one or more ACK bits are transmitted in a same symbol using frequency division multiplexing (FDM); and
    transmitting the UCI using the identified resources.

2. The method of claim 1, wherein the identifying comprises:
    identifying a first resource block (RB) within the ULSB for transmitting the SR bit and the one or more ACK bits; or
    identifying a second RB for transmitting the SR bit without the one or more ACK bits.

3. The method of claim 2, wherein the first RB is identified based on a value of the SR bit.

4. The method of claim 3, wherein the value of the SR bit corresponds to a negative or a positive SR.

5. The method of claim 2, wherein identifying the first resource block (RB) further comprises:

identifying at least a first set of two bit-sequences to use to convey an ACK bit of the one or more ACK bits and the SR bit having a first value using the first RB; and
identifying at least a second set of two bit-sequences to use to convey the ACK bit of the one or more ACK bits and the SR bit having a second value using the first RB.

6. The method of claim 2, wherein identifying the first resource block (RB) further comprises:
identifying at least a first set of four bit-sequences to use to convey two ACK bits of the one or more ACK bits and the SR bit having a first value using the first RB; and
identifying at least a second set of four bit-sequences to use to convey the two ACK bits of the one or more ACK bits and the SR bit having a second value using the first RB.

7. The method of claim 2, wherein the second RB is identified when there are no ACK bits to be transmitted, and wherein a value of the SR bit is for a positive SR.

8. The method of claim 1, wherein the identifying comprises:
identifying a first symbol in the ULSB semi-statically configured for transmission of the SR bit; and
using the first symbol for transmission of at least one ACK bit of the one or more ACK bits.

9. The method of claim 8, further comprising:
using a second symbol for transmission of the SR bit, wherein the second symbol is located in one of: the ULSB, an uplink long burst (ULLB) region of the TTI, or a subsequent TTI.

10. The method of claim 1, wherein the identifying comprises:
identifying a first resource block (RB) within the ULSB for transmitting the SR bit if the SR bit is a first value; or
identifying a second RB within the ULSB for transmitting the SR bit if the SR bit is a second value.

11. The method of claim 10, wherein:
the first value of the SR bit is for a positive SR and the second value of the SR bit is for a negative SR.

12. The method of claim 10, wherein the identifying comprises:
identifying at least four bit-sequences to use to convey at least two ACK bits when transmitting the SR bit using the first RB or the second RB.

13. The method of claim 12, wherein the identifying further comprises identifying at least one of the at least four bit-sequences for transmitting the SR bit without ACK bits using the first RB for the SR bit being the first value.

14. The method of claim 10, wherein the identifying comprises:
identifying one bit-sequence in one RB for transmitting the SR bit without ACK bits; or
identifying at least two RBs for transmitting the SR bit with at least two ACK bits of the one or more ACK bits; and
identifying at least four bit-sequences to use to convey the at least two ACK bits of the one or more ACK bits when transmitting the SR bit using one of the at least two RBs.

15. The method of claim 1, wherein:
the SR bit and the one or more ACK bits are transmitted in adjacent RBs.

16. The method of claim 1, further comprising:
splitting power between the SR bit and the one or more ACK bits.

17. The method of claim 1, wherein:
the SR bit and the one or more ACK bits are transmitted in the same symbol using FDM only if a power headroom (PHR) is above a threshold value.

18. The method of claim 1, wherein:
the SR bit and the one or more ACK bits are transmitted in the same symbol in ACK resource with the one or more ACK bits bundled to a single bit if a power headroom (PHR) is below a threshold value.

19. The method of claim 1, wherein the identifying comprises:
identifying a first resource block (RB) within the ULSB used for a first one of the one or more ACK bits if the first ACK bit is a first value; or
identifying a second RB within the ULSB used for the first ACK bit if the first ACK bit is a second value.

20. The method of claim 19, wherein the identifying comprises:
identifying at least four bit-sequences to use to convey at least two ACK bits of the one or more ACK bits when transmitting SR using the first RB or the second RB.

21. The method of claim 19, wherein the identifying comprises:
identifying one RB for transmitting the SR bit without ACK bits; or
identifying at least two RBs for transmitting the SR bit with at least the first ACK bit of the one or more ACK bits.

22. A method for wireless communications by a user equipment, comprising:
identifying extended resources, adjacent in time to a common uplink region within a transmission time interval (TTI), dynamically available for uplink transmission by the UE, wherein the extended resources are identified using a hopping position calculated based on the common uplink region; and
sending an uplink transmission using the extended resources.

23. The method of claim 22, wherein the extended resources comprise at least one of:
resources occurring prior to the common uplink region; or
resources occurring after to the common uplink region.

24. The method of claim 22, wherein different durations of the extended resources are available to different UEs, including the UE.

25. The method of claim 22, wherein the common uplink region is shared between UEs using code division multiplexing (CDM) groups, and wherein the extended resources are shared between the UEs using code division multiplexing (CDM) groups.

26. The method of claim 25, wherein the CDM groups of the common uplink region and the extended resources are not overlapping in time.

27. An apparatus, comprising:
a non-transitory memory comprising executable instructions; and
a processor in data communication with the memory and configured, by executing the instructions, to:
identify resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions, wherein the SR bit and the one or more ACK bits are transmitted in a same symbol using frequency division multiplexing (FDM); and
transmit the UCI using the identified resources.

28. The apparatus of claim 27, wherein the processor being configured to identify the resources is further configured to:
identify a first resource block (RB) within the ULSB for transmitting the SR bit and the one or more ACK bits; or
identify a second RB for transmitting the SR bit without the one or more ACK bits.

29. The apparatus of claim 28, wherein the first RB is identified based on a value of the SR bit.

30. The apparatus of claim 29, wherein the value of the SR bit corresponds to a negative or a positive SR.

31. The apparatus of claim 28, wherein the processor being configured to identify the first RB is further configured to:
identify at least a first set of two bit-sequences to use to convey an ACK bit of the one or more ACK bits and the SR bit having a first value using the first RB; and
identify at least a second set of two bit-sequences to use to convey the ACK bit of the one or more ACK bits and the SR bit having a second value using the first RB.

32. The apparatus of claim 28, wherein the processor being configured to identify the first RB is further configured to:
identify at least a first set of four bit-sequences to use to convey two ACK bits of the one or more ACK bits and the SR bit having a first value using the first RB; and
identify at least a second set of four bit-sequences to use to convey the two ACK bits of the one or more ACK bits and the SR bit having a second value using the first RB.

33. The apparatus of claim 28, wherein the second RB is identified when there are no ACK bits to be transmitted, and wherein a value of the SR bit is for a positive SR.

34. The apparatus of claim 27, wherein the processor being configured to identify the resources is further configured to:
identify a first symbol in the ULSB semi-statically configured for transmission of the SR bit; and
use the first symbol for transmission of at least one ACK bit of the one or more ACK bits.

35. The apparatus of claim 34, wherein the processor is further configured to:
use a second symbol for transmission of the SR bit, wherein the second symbol is located in one of: the ULSB, an uplink long burst (ULLB) region of the TTI, or a subsequent TTI.

36. The apparatus of claim 27, wherein the processor being configured to identify the resources is further configured to:
identify a first resource block (RB) within the ULSB for transmitting the SR bit if the SR bit is a first value; or
identify a second RB within the ULSB for transmitting the SR bit if the SR bit is a second value.

37. The apparatus of claim 36, wherein:
the first value of the SR bit is for a positive SR and the second value of the SR bit is for a negative SR.

38. The apparatus of claim 36, wherein the processor being configured to identify the resources is further configured to:
identify at least four bit-sequences to use to convey at least two ACK bits when transmitting the SR bit using the first RB or the second RB.

39. The apparatus of claim 38, wherein the processor being configured to identify the resources is further configured to:
identify at least one of the at least four bit-sequences for transmitting the SR bit without ACK bits using the first RB for the SR bit being the first value.

40. The apparatus of claim 36, wherein the processor being configured to identify the resources is further configured to:
identify one bit-sequence in one RB for transmitting the SR bit without ACK bits; or
identify at least two RBs for transmitting the SR bit with at least two ACK bits of the one or more ACK bits; and
identify at least four bit-sequences to use to convey the at least two ACK bits of the one or more ACK bits when transmitting the SR bit using one of the at least two RBs.

41. The apparatus of claim 27, wherein:
the SR bit and the one or more ACK bits are transmitted in adjacent RB s.

42. The apparatus of claim 27, further the processor is further configured to:
splitting power between the SR bit and the one or more ACK bits.

43. The apparatus of claim 27, wherein:
the SR bit and the one or more ACK bits are transmitted in the same symbol using FDM only if a power headroom (PHR) is above a threshold value.

44. The apparatus of claim 27, wherein:
the SR bit and the one or more ACK bits are transmitted in the same symbol in ACK resource with the one or more ACK bits bundled to a single bit if a power headroom (PHR) is below a threshold value.

45. The apparatus of claim 27, wherein the processor being configured to identify the resources is further configured to:
identify a first resource block (RB) within the ULSB used for a first one of the one or more ACK bits if the first ACK bit is a first value; or
identify a second RB within the ULSB used for the first ACK bit if the first ACK bit is a second value.

46. The apparatus of claim 45, wherein the processor being configured to identify the resources is further configured to:
identify at least four bit-sequences to use to convey at least two ACK bits of the one or more ACK bits when transmitting SR using the first RB or the second RB.

47. The apparatus of claim 45, wherein the processor being configured to identify the resources is further configured to:
identify one RB for transmitting the SR bit without ACK bits; or
identify at least two RBs for transmitting the SR bit with at least the first ACK bit of the one or more ACK bits.

48. An apparatus, comprising:
a non-transitory memory comprising executable instructions; and
a processor in data communication with the memory and configured, by executing the instructions, to:
identify extended resources, adjacent in time to a common uplink region within a transmission time interval (TTI), dynamically available for uplink transmission by the apparatus, wherein the extended resources are identified using a hopping position calculated based on the common uplink region; and
send an uplink transmission using the extended resources.

49. The apparatus of claim 48, wherein the extended resources comprise at least one of:
  resources occurring prior to the common uplink region; or
  resources occurring after to the common uplink region.

50. The apparatus of claim 48, wherein different durations of the extended resources are available to different apparatuses.

51. The apparatus of claim 48, wherein the common uplink region is shared between UEs using code division multiplexing (CDM) groups, and wherein the extended resources are shared between the UEs using code division multiplexing (CDM) groups.

52. The apparatus of claim 51, wherein the CDM groups of the common uplink region and the extended resources are not overlapping in time.

53. An apparatus, comprising:
  means for identifying resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions, wherein the SR bit and the one or more ACK bits are transmitted in a same symbol using frequency division multiplexing (FDM); and
  means for transmitting the UCI using the identified resources.

54. A non-transitory computer readable medium having instructions stored thereon for performing a method comprising:
  identifying resources, within an uplink short burst (ULSB) region within a transmission time interval (TTI), for transmitting at least a portion of uplink control information (UCI), the UCI including at least one of one scheduling request (SR) bit and one or more acknowledgment (ACK) bits for acknowledging or negatively acknowledging downlink transmissions, wherein the SR bit and the one or more ACK bits are transmitted in a same symbol using frequency division multiplexing (FDM); and
  transmitting the UCI using the identified resources.

55. An apparatus, comprising:
  means for identifying extended resources, adjacent in time to a common uplink region within a transmission time interval (TTI), dynamically available for uplink transmission by the apparatus, wherein the extended resources are identified using a hopping position calculated based on the common uplink region; and
  means for sending an uplink transmission using the extended resources.

56. A non-transitory computer readable medium having instructions stored thereon for performing a method comprising:
  identifying extended resources, adjacent in time to a common uplink region within a transmission time interval (TTI), dynamically available for uplink transmission by a UE, wherein the extended resources are identified using a hopping position calculated based on the common uplink region; and
  sending an uplink transmission using the extended resources.

* * * * *